No. 609,862.  
E. J. WING.  
COLTER.  
(Application filed Nov. 20, 1897.)  
Patented Aug. 30, 1898.

(No Model.)

Witnesses  
J. Gauf Culverwell,  
J. H. J. Riley

By his Attorneys,  
C. A. Snow & Co.

Inventor  
Edward J. Wing.

THE NORRIS PETERS CO., PHOTO-LITHO., WASHINGTON, D. C.

UNITED STATES PATENT OFFICE.

EDWARD JAMES WING, OF CENTRE HILL, FLORIDA.

COLTER.

SPECIFICATION forming part of Letters Patent No. 609,862, dated August 30, 1898.

Application filed November 20, 1897. Serial No. 659,342. (No model.)

*To all whom it may concern:*

Be it known that I, EDWARD JAMES WING, a citizen of the United States, residing at Centre Hill, in the county of Sumter and State of Florida, have invented a new and useful Colter, of which the following is a specification.

The invention relates to improvements in colters.

The object of the present invention is to improve the construction of colters and to provide a simple, inexpensive, and efficient one adapted to be readily applied to the beam of any ordinary plow and capable of effectively cutting sod, roots, vines, high grass, and the like, and thereby preventing a plow from becoming clogged.

A further object of the invention is to provide a yieldingly-mounted colter which will exert a shear or saw like action on sods, roots, and vines and which will be capable of springing vertically and laterally should it come in contact with a stone or other hard substance to enable it to pass over or by the same without being injured.

The invention consists in the construction and novel combination and arrangement of parts hereinafter fully described, illustrated in the accompanying drawings, and pointed out in the claims hereto appended.

Figure 1:
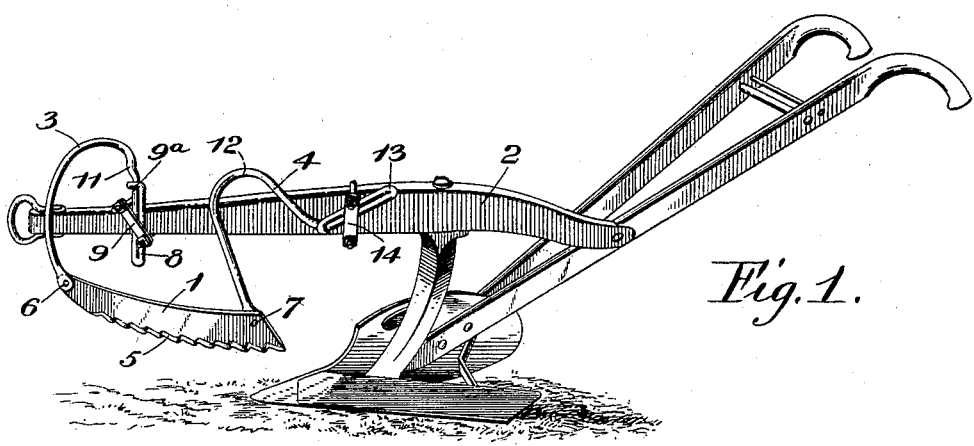
Figures 2, 3:
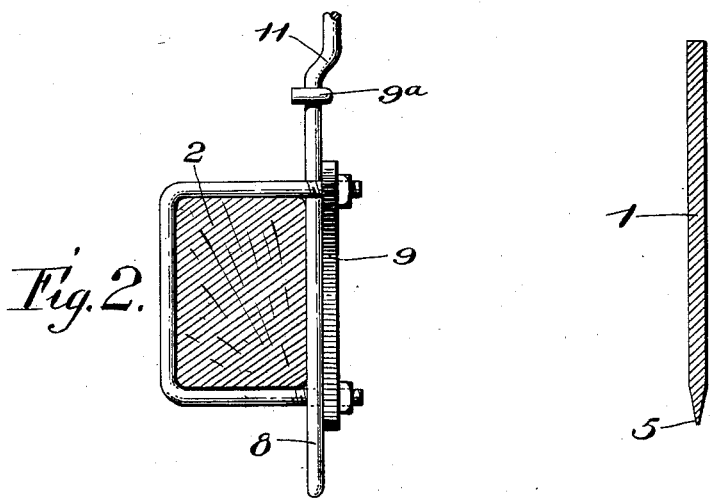

In the drawings, Figure 1 is a perspective view of a colter constructed in accordance with this invention and shown applied to a plow. Fig. 2 is a detail sectional view taken transversely of the same. Fig. 3 is a sectional view of the colter-blade.

Like numerals of reference designate corresponding parts in all the figures of the drawings.

1 designates a colter-blade connected with a plow-beam 2 by front and rear springs 3 and 4, located at the off side of the plow, and the colter-blade is arranged at a slight inclination in advance of the plow-point in position for cutting sod, roots, vines, tall grass, and the like to prevent the plow from becoming clogged by such means. The colter-blade, which is slightly tapering toward its front end, is provided at its lower edge with teeth arranged in a slightly-curved series and oppositely beveled. These teeth 5, which have curved cutting edges, are adapted to exert a shear or saw like action in cutting, and the springs contribute to this result.

The lower ends of the springs 3 and 4 are connected with the front end of the colter-blade and with the rear portion of the same slightly in advance of the rear end by front and rear pivots 6 and 7, forming joints that permit the blade to swing upward readily, so as to pass over a stone or other hard substance without injury. The depending portions of the springs are also sufficiently resilient to permit the colter to spring laterally and pass an obstruction when it does not strike the same squarely, and the said colter-blade is not injured by contact with stones or other hard substances which it is unable to cut.

The front spring, which is substantially U-shaped, has its rear side 8 secured to the plow-beam by a clip 9, and its front side, which is longer than the rear one, curves downward and rearward to the front of the colter-blade. The rear side 8 is reinforced by doubling the metal on itself, and the adjacent terminal 9ª of the metal is bent around the spring, as shown. The reinforced portion of the spring is disposed substantially vertical, and the clamp or clip 9, which embraces the plow-beam, permits the front spring to be raised and lowered for adjusting the colter and enabling the same to be positioned properly with relation to the beam to which it is to be applied. The arched portion of the front spring is located above the plow-beam and is laterally offset at 11 from the reinforced portion to clear the side fastenings employed on the front of some plow-beams and enable the colter to be applied to any plow.

The rear spring 4, which extends downward from the plow-beam at an inclination, is provided between its ends with a forwardly-extending U-shaped bend 12, which forms a spring and operates to hold the rear portion of the colter-blade to the work, but at the same time permits the blade to spring upward readily. The upper portion 13 of the spring 4 is reinforced similar to the rear side of the front spring and is secured to the plow-beam by a clip or clamp 14, constructed similar to that of the front spring.

The invention has the following advantages: The colter is simple and comparatively inexpensive in construction, it is adapted to be readily applied to the beam of any plow, and it is capable of ready adjustment to position it properly with relation to the plow-beam. The blade is adapted to exert a shear-like action on tall grass, sod, vines, roots, and the like, and it is capable of passing over or springing laterally out of the way of stones or other substances too hard for it to cut.

Changes in the form, proportion, and the minor details of construction may be resorted to without departing from the principle or sacrificing any of the advantages of this invention.

What I claim is—

1. A device of the class described comprising a colter-blade designed to be mounted on a plow-beam in advance of the plow-point, and springs for connecting the blade to the plow-beam and pivotally secured to the blade, whereby the latter is permitted to spring vertically and produce a shear or saw cut, substantially as and for the purpose described.

2. In a device of the class described, the combination with a plow-beam, of a colter-blade provided with teeth and disposed at a slight inclination, in advance of the plow-point, and springs connecting the blade with the plow-beam, substantially as described.

3. In a device of the class described, the combination with a plow-beam, of a colter-blade, the substantially U-shaped front spring pivotally connected to the front of the colter-blade and secured to the plow-beam, and the rear spring secured to the beam and pivoted to the blade, said rear spring being provided between its ends with a substantially U-shaped bend, substantially as specified.

4. In a device of the class described, the combination with a plow-beam, of a colter-blade, front and rear springs, each having one end connected with the blade, and having its other end reinforced by doubling the metal on itself and bending the terminal around the spring, and clips or clamps adjustably securing the reinforced portions of the springs to the beam, substantially as specified.

In testimony that I claim the foregoing as my own I have hereto affixed my signature in the presence of two witnesses.

EDWARD JAMES WING.

Witnesses:
J. H. CARTER,
W. J. WILSON.